(12) United States Patent
Urata (10) Patent No.: US 7,004,391 B2
(45) Date of Patent: Feb. 28, 2006

(54) OPTICAL GAIN CORRECTION FILTER AND OPTICAL APPARATUS HAVING THE SAME

(75) Inventor: Norikazu Urata, Central Green (SG)

(73) Assignee: Olympus Optical Co., Ltd., Tokyo (JP)

( * ) Notice: Subject to any disclaimer, the term of this patent is extended or adjusted under 35 U.S.C. 154(b) by 203 days.

(21) Appl. No.: 10/612,037

(22) Filed: Jul. 1, 2003

(65) Prior Publication Data
US 2004/0046107 A1 Mar. 11, 2004

(30) Foreign Application Priority Data
Jul. 3, 2002 (JP) ............................. 2002-195110

(51) Int. Cl.
*G06K 7/10* (2006.01)
(52) U.S. Cl. ................. 235/454; 235/455; 235/462.36; 359/487; 359/590; 359/196; 250/208.1
(58) Field of Classification Search ................ 235/454, 235/455, 462.36; 359/487, 590, 196; 250/208.1
See application file for complete search history.

(56) References Cited

U.S. PATENT DOCUMENTS

| | | | | |
|---|---|---|---|---|
| 5,923,021 A | * | 7/1999 | Dvorkis et al. ............. | 235/455 |
| 5,925,875 A | * | 7/1999 | Frey ........................ | 250/208.1 |
| 5,982,540 A | * | 11/1999 | Koike et al. ................ | 359/487 |
| 2003/0024989 A1 | * | 2/2003 | Aizawa .................. | 235/462.36 |
| 2003/0118477 A1 | * | 6/2003 | Liljestrand et al. ........... | 422/52 |
| 2003/0142408 A1 | * | 7/2003 | Lee et al. .................... | 359/590 |
| 2004/0165641 A1 | * | 8/2004 | Garnache et al. ............. | 372/97 |
| 2004/0240016 A1 | * | 12/2004 | Shimomura ................. | 359/196 |

FOREIGN PATENT DOCUMENTS

| JP | 6-176185 A | 6/1994 |
|---|---|---|
| JP | 8-055178 A | 2/1996 |

* cited by examiner

*Primary Examiner*—Karl D. Frech
*Assistant Examiner*—Allyson N Trail
(74) *Attorney, Agent, or Firm*—Frishauf, Holtz, Goodman & Chick, P.C.

(57) ABSTRACT

The present invention provides an optical apparatus comprising an optical gain correction filter having a multilayer film structure formed by stacking a plurality of thin films with different diffractive indexes on a light transmitting board, wherein when the light with the wavelength $\lambda$ enters at the incident angle $\theta$, the transmissivity is assumed to be $T1 (\lambda, \theta)$ ($0 \leq T1 (\lambda, \theta) \leq 1$), and the thickness and stacking state of each thin film of the optical gain correction filter are adjusted to increase the transmissivity $T1 (\lambda_0, \theta)$ when the incident angle $\theta$ increases close to the predetermined maximum incident angle $\theta$max with respect to the incident light with the wavelength $\lambda_0$. The optical apparatus is applied to a bar code reader.

24 Claims, 5 Drawing Sheets

FIG. 10

OPTICAL GAIN CORRECTION FILTER AND OPTICAL APPARATUS HAVING THE SAME

CROSS-REFERENCE TO RELATED APPLICATIONS

This application is based upon and claims the benefit of priority from the prior Japanese Patent Application No. 2002-195110, filed Jul. 3, 2002, the entire contents of which are incorporated herein by reference.

BACKGROUND OF THE INVENTION

1. Field of the Invention

The present invention relates to a bar code reader which optically reads information, and more particularly, an optical gain correction filter used for receiving reflected light holding information, and an optical apparatus having the same.

2. Description of the Related Art

Generally, information management techniques using symbol information such as a bar code are now widespread in all fields of industry, particularly in manufacturing and physical distribution. "Symbol information" means the combination of bars and spaces defined for recognizing optical information, or symbols or engraved bumps and dips or the like, for increasing the efficiency of inputting information.

As a bar code reader, a laser type reader using a semiconductor laser element, and a line sensor type reader using a line sensor element are known.

As a laser type bar code reader, a slot type scanner and a gun type scanner are known. In these bar code readers, a semiconductor laser light source is mounted, and a laser beam emitted from the light source is deflected and iteratively scanned by a drive mirror or the like. When the user radiates a scanning laser beam to the surface of a bar code stuck to an article, the light is scattered on the bar code surface, taken into a photodetector, converted to an electric signal, and decoded. The laser type bar code reader is useful in the circumstances where the distance from the reader to a bar code is relatively far, or the reader reads the bar code stuck to a moving article.

Contrarily, in the line sensor type bar code reader, a light source such as an LED is combined with an image pickup element such as a line sensor. As well known as a touch type scanner, when the user touches the image pickup area of a bar code reader to the illuminated surface of a bar code, the bar code image (an optical image) is formed by an image pickup lens on the light receiving surface of the line sensor, and taken in as an electric signal by opto-electric conversion. The electric signal is processed variously, and decoded.

Although these bar code readers are very similar in function, the reading method is different, as explained above. Due to the optical nature of a laser beam, the laser type bar code reader can read a bar code with relatively less degradation in the circumstances where the reader reads a bar code from a distant location.

The line sensor type bar code reader needs certain illumination, and degrades when reading a bar code from a distance. Thus, it is suitable for reading a relatively close bar code. However, the reading width (the angle of view) is wide, and it is necessary to correct a peripheral light intensity loss. Use of a line sensor enables so-called shading correction.

As a prior art of the above-mentioned types of bar code reader, a bar code reading range is broadened and optimized by making the shape of a laser beam spot cylindrical, as disclosed by Jpn. Pat. Appln. KOKAI Publication No. 8-55178. Further, as a prior art of the line sensor type bar code reader, a peripheral light intensity loss is corrected by adjusting the current supplied to each illumination LED, as disclosed in Jpn. Pat. Appln. KOKAI Publication No. 6-176185.

As described above, the aptitude of conventional bar code readers depends on the reading circumstances, for example, the distance to a bar code, and each reader is not constructed with general versatility. It is technically possible to mount both types of bar code reader in one system, but the size and weight increase, making it less easy to handle, and the cost rises. Because of these problems, a system having both types of bar code reader has not been produced.

Therefore, when the reading circumstances change after a system is built based on one reading method, the user cannot use a bar code reader for a different reading method. If the user wishes to use that bar code reader, the whole system must be modified, which is financially disadvantageous.

In addition, when a bar code reader is used in various fields and a plurality of bar code reading methods are introduced, the manufacturer must develop a plurality of similar modes, increasing an economical load in development, manufacturing and sales.

For example, when the line sensor type bar code reader is modified to be able to read a bar code from a distance, a peripheral light intensity loss arises, and an illumination light must be made brighter. And, when the number of illumination LEDS is increased for this purpose, the power consumption and product size increases, causing practical inconvenience.

On the other hand, the number of light sources may be only one in the bar code reader using a semiconductor laser light source, if it can be designed to be used also as a contact type reader. However, a peripheral light intensity loss, explained later, occurs in this type of bar code reader as a laser beam is scanned. The bar code reader of this type has only one semiconductor laser source, and it cannot correct a peripheral light intensity loss by the same method as that applied to the line sensor type bar code reader.

Now a peripheral light intensity loss will be explained.

Figure 11:
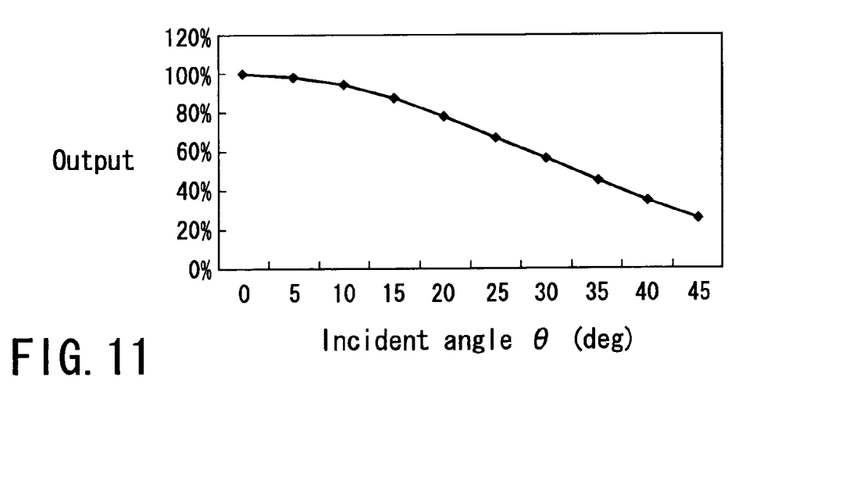
FIG. 11 is a graph showing conceptually the distribution of luminous intensity (peripheral light intensity loss), which occurs in general image forming optics in line sensor type and laser type bar code readers.

Generally, in a light receiving element of an optical apparatus, a peripheral light intensity loss as conceptually indicated in FIG. 11 occurs. This is so-called cosine-to-the-fourth or lens vignetting, that is the phenomenon to decrease the receiving light quantity as the incident angle increases.

For example, assuming the angle of view necessary to read a bar code to be about 40°, as seen from FIG. 11, the signal obtained from an optical signal element is lost about 60% by a peripheral light intensity loss. This means that the bar code reading performance is extremely degraded.

Namely, when the peripheral light intensity loss is large, the light intensity fluctuates largely. In the analog-digital conversion in a binarization circuit by giving a threshold value, the above-mentioned signal with the peripheral light intensity loss is added to the signal corresponding to the pattern of a bar code, and these two signals coexist, degrading the binarization accuracy. For example, consider the case of setting a threshold value for binarization high in the signal processing circuit which binarizes the pattern of a bar code.

Even if the light intensity fluctuates largely due to a peripheral light intensity loss, a malfunction of the binarization circuit can be reduced, but for a bar code with a low contrast and a bar code with a high density, binarization becomes difficult and the bar code reading performance degrades. Contrarily, when the binarization threshold value is set small in the binarization circuit, the binarization is improved for the bar codes with the low contrast and high density. However, as for the periphery, where a peripheral light intensity loss occurs, the light intensity fluctuates largely and the binarization accuracy degrades. This results in extreme deterioration in the angle of view for reading. Similar degradation occurs under the reading conditions where the bar code signal amplitude becomes bad, for example, when the distance to a bar code is changed and defocused. Therefore, when the peripheral light intensity loss is large, the bar code reading performance is extremely degraded in general.

BRIEF SUMMARY OF THE INVENTION

It is an object of the present invention to provide an optical gain correction filter with excellent general versatility, which contains a touch type bar code reader having a semiconductor laser light source, corrects a peripheral light intensity loss, and stabilizes the performance of reading high-density, low-contrast and wide bar codes, and an optical apparatus which has the same optical gain correction filter.

To achieve the above-mentioned object, an optical gain correction filter is provided, which has a multilayer film structure formed by stacking a plurality of thin films with different refractive indices on a light transmitting board, wherein when a light with the wavelength $\lambda$ enters at the incident angle $\theta$, the transmissivity is assumed to be T1 ($\lambda$, $\theta$) ($0 \leq$ T1 ($\lambda$, $\theta$) $\leq 1$), and the thickness of each thin film is set to increase the transmissivity T1 ($\lambda$, $\theta$) when the incident angle $\theta$ increases close to the predetermined maximum incident angle $\theta$max with respect to the incident light with the wavelength $\lambda_0$ entering the multilayer structure.

In the above-mentioned optical gain correction filter, when a light with the wavelength $\lambda$ enters at the incident angle $\theta$, the transmissivity is assumed to be T1 ($\lambda$, $\theta$) ($0 \leq$ T1 ($\lambda$, $\theta$) $\leq 1$), and the thickness of each thin film of the multilayer film structure is set to increase the transmissivity T1 ($\lambda$, $\theta_0$) when the wavelength $\lambda$ increases close to the predetermined maximum wavelength $\lambda$max with respect to the incident light entering the multilayer structure at the incident angle of $\theta_0$.

In addition, an optical gain correction filter is provided, which has a multilayer film structure formed by stacking a plurality of thin films with different refractive indices on a light reflecting board, wherein when light with the wavelength $\lambda$ enters at the incident angle $\theta$, the reflectivity is assumed to be R1 ($\lambda$, $\theta$) ($0 \leq$ R1 ($\lambda$, $\theta$) $\leq 1$), and the thickness of each thin film of the multilayer film structure is set to increase the reflectivity R1 ($\lambda_0$, $\theta$) when the incident angle $\theta$ increases close to the predetermined maximum incident angle $\theta$max with respect to the incident light with the wavelength $\lambda_0$ entering the multilayer structure.

In the above-mentioned optical gain correction filter, when a light with the wavelength $\lambda$ enters at the incident angle $\theta$, the reflectivity is assumed to be R1 ($\lambda$, $\theta$) ($0 \leq$ R1 ($\lambda$, $\theta$) $\leq 1$), and the thickness of each thin film of the multilayer film structure is set to increase the reflectivity R1 ($\lambda$, $\theta_0$) when the wavelength $\lambda$ increases close to the predetermined maximum wavelength $\lambda$max with respect to the incident light entering the multilayer structure at the incident angle of $\theta_0$.

By arranging the optical gain correction filter with the abovementioned structure on the optical path of a laser beam, and in the direction where the reflectivity R1 ($\lambda$, $\theta$) increases as the laser beam scanning angle increases, the peripheral light intensity loss is corrected. Even if a touch type bar code reader is configured by using a semiconductor laser light source, the peripheral light intensity loss can be corrected, and the signal obtained from the photoconductor can be stabilized. Therefore, it is possible to provide a bar code reader which corrects the peripheral light intensity loss by the above-mentioned optical gain correction filter, with a simple structure, and provide an excellent bar code reading performance even if the incident angle or scanning angle is enlarged.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

Hereinafter preferred embodiments of the present invention will be explained in detail with reference to the attached drawings.

Figure 1:
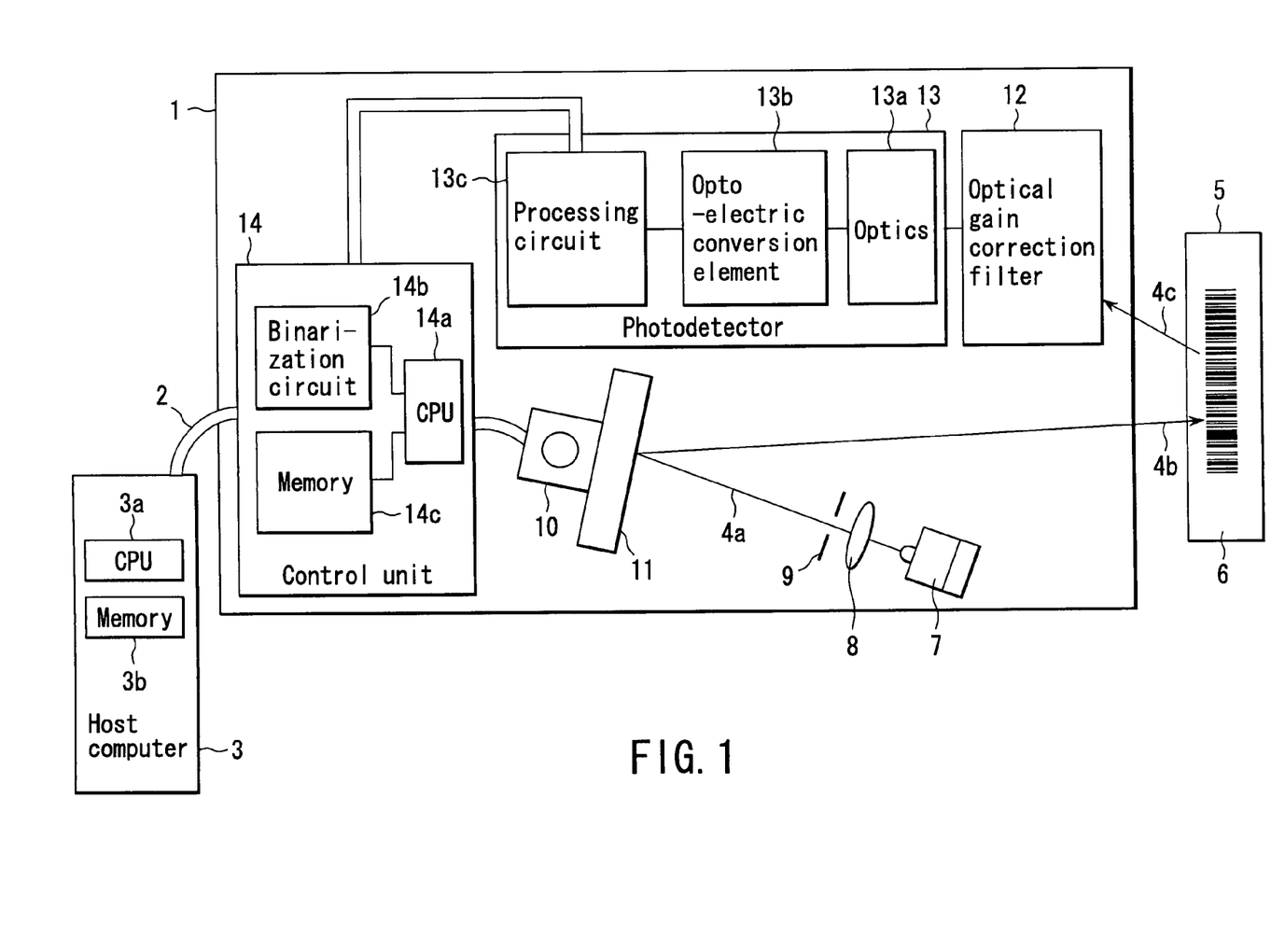
FIG. 1 is a diagram showing an example of a conceptual configuration of an optical apparatus having an optical gain correction filter according to a first embodiment of the present invention, applied to a bar code reader.

FIG. 1 is a diagram showing an example of a configuration of an optical apparatus having an optical gain correction filter according to a first embodiment of the present invention, applied to a bar code reader. The bar code reader emits a laser beam 4b scanned from an optical apparatus 1 to a bar code 6 stuck on an article 5, receives the reflected light (scattered light), generates an electric signal, decodes the information of the bar code 6, and outputs the decoded information to a host computer 3 through an interface 2. The host computer 3 receives the decoded information, and automatically performs the predetermined various processing such as arrival/shipment management of goods, according to the kind of the article 5.

The optical apparatus 1 comprises a semiconductor laser light source 7 which emits a laser beam 4a of a predetermined wavelength, a lens 8 and diaphragm 9 which focus the laser beam 4a to a predetermined width, a scanner 10 which turns a reflector mirror iteratively by electromagnetic fluctuation, and emits the laser beam 4a radiated to the reflector mirror 11 to a bar code 6 as a scanning laser beam 4b, and optical gain correction filter 12 which takes in the reflected light of the laser beam 4b scattered on the surface of the bar code 6, a photodetector 13 which receives the scattered light passing the filter 12 and converts it to an electric signal, and a control unit 14 which controls the components of the optical apparatus 1, according to the instructions from the host computer 3. The photodetector 13 has optics 13a, an opto-electric conversion element 13b, and a processing circuit 13c. The control unit 14 has a CPU (Central Processing Unit) 14a, a binarization circuit 14b and a memory 14c, and controls the whole optical apparatus by performing various processings, including decoding.

Now, emission of the scanned laser beam and reception of the reflected light (scattered light) in the above-mentioned configuration will be explained.

First, a laser beam 4a with the wavelength $\lambda_0$=650 nm is emitted from a semiconductor laser light source 7, reflected on the rotating reflector mirror 11, becoming a laser beam 4b to be scanned. The laser beam 4b is radiated to the bar code 6, and scattered on the surface of the bar code 6. The intensity of a scattered light 4c fluctuates corresponding to the pattern of bars and spaces of the bar code. A part of the scattered light 4c enters the optical gain correction filter 12 at the incident angle of θ. The optical gain correction filter 12 has a spectral transmissivity, explained later. Assuming the maximum absolute incident angle θ to be θmax, the maximum incident angle θmax depends on the maximum angle of the above-mentioned iterative scanning, and the incident angle θ fluctuates iteratively in a range of −θmax≦θ≦θmax, synchronized with the scanning.

The light passing through the optical gain correction filter 12 enters the photodetector 13. The photodetector 13 condenses the incident scattered light on the light receiving surface of the opto-electric conversion element, generates an electric signal based on the scattered light by opto-electric conversion, and outputs the electric signal to the control unit 14. The control unit 14 binarizes the electric signal from the photodetector 13 which iteratively detects the pattern of the bar code 6, by the binarization circuit 14b, and decodes the information which has been encoded to the bar code 6 by the CPU14a.

The decoded information is sent to the host computer 6 through the interface 2. The host computer 3, having CPU 3a and memory 3b, performs predetermined processing for the article 5, based on the information contained in the bar code 6 received from the optical apparatus 1.

Next, the function of the optical gain correction filter 12 will be explained in detail with reference to FIG. 2–FIG. 4.

Figure 2:
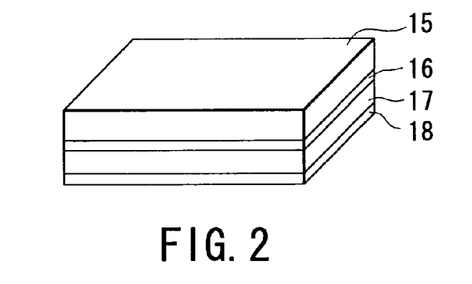
FIG. 2 is a view showing an external configuration of the optical gain correction filter according to the first embodiment.
Figure 3:
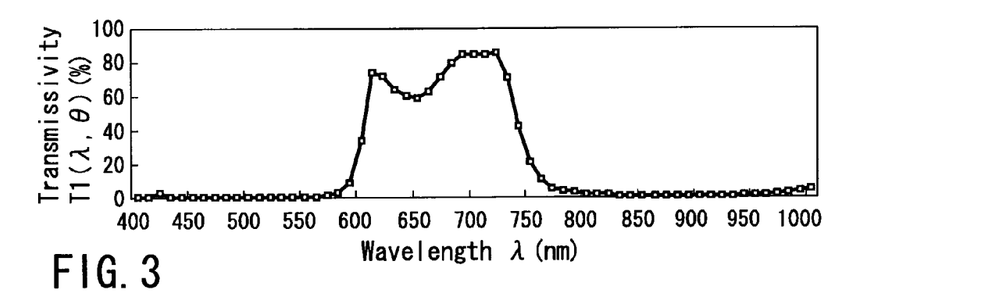
FIG. 3 is a graph showing the spectral transmissivity of the optical gain correction filter according to the first embodiment, against a vertical incident light with the incident angle of 0°.

FIG. 2 shows the external view of the optical gain correction filter 12. In the optical gain correction filter 12, a red resin board 15 and a glass board 17 evaporated with a dielectric multilayer film 18, are glued tightly in one body by an adhesive 16 that is transparent in visible light. FIG. 3 shows the spectral transmissivity of the optical gain correction filter 12 against a vertical incident light. As shown in FIG. 3, the optical gain correction filter is a band pass filter with the band width of about 130 nm, which passes only the light with the wavelength $\lambda_0$ close to 650 nm of the semiconductor laser light source 7, and shuts off other light as an external light noise. Of course, the wavelength $\lambda_0$ of the semiconductor laser light source 7 is not fixed, and can be changed by the design. The optical gain correction filter 12 may be designed with the band width through which the changed wavelength $\lambda_0$ can pass.

Further, the optical gain correction filter is designed so that the wavelength $\lambda_0$ of the semiconductor laser light source 7 coincides with the position of a ripple of the band pass filter. Namely, while the transmissivity of light with the wavelength $\lambda_0$ to be used is 90% or more in an ordinary band pass filter, the transmissivity is intentionally decreased to about 70% or lower in the optical gain correction filter 12 in this embodiment.

Figure 8:
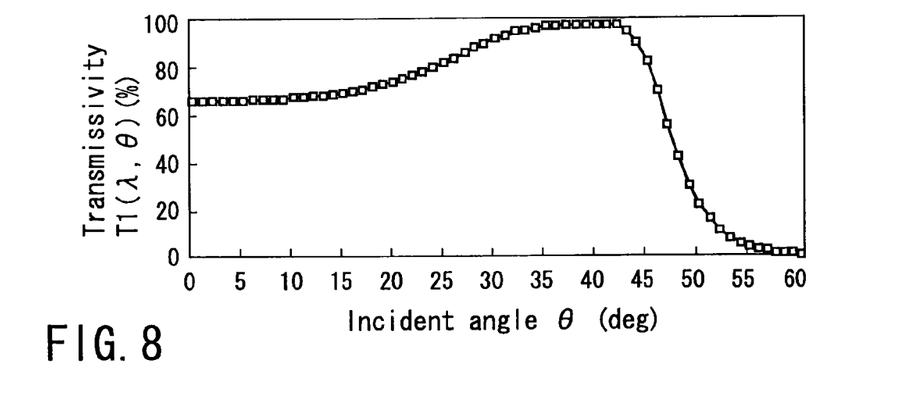
FIG. 8 is a graph showing the change in the transmissivity when the incident angle is changed against the semiconductor laser light source in the optical gain correction filter of the first embodiment.

The optical gain correction filter 12 has the function of increasing the transmissivity T1 ($\lambda$, θ) as the incident light angle increases, as shown later in FIG. 8. FIG. 4 shows the luminous intensity in the light receiving element, when the optical gain correction filter 12 is mounted. In the graph, the dotted line indicates an example of luminous intensity when an ordinary band pass filter is mounted, which is equivalent to that shown in FIG. 11 mentioned above. The solid line indicates the luminous intensity when the optical gain correction filter 12 of this embodiment is mounted.

Figure 4:
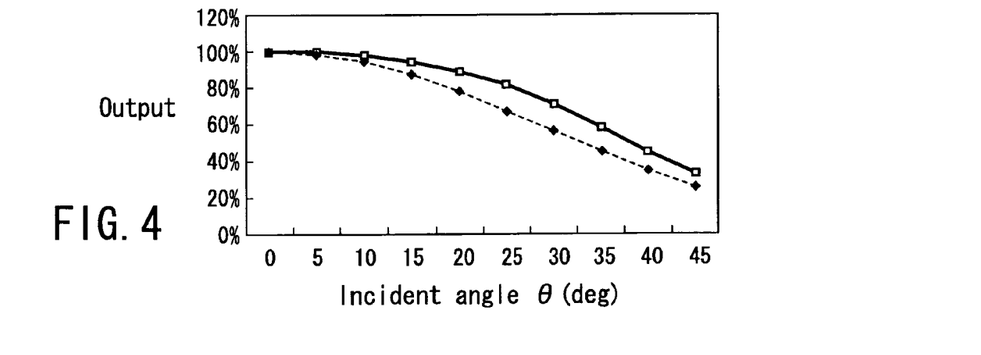
FIG. 4 is a graph explaining a peripheral light intensity loss in a light receiving element which contains the optical gain correction filter according to the first embodiment.

As shown in FIG. 4, as the incident angle θ increases to 20–40°, the peripheral light intensity loss can be improved by about 10 points or more. In the area where the light intensity loss decreases to 20% or lower, the incident angle of about 20° can be improved to about 25° by using the optical gain correction filter of this embodiment. This enlarges the area where the bar code reading performance is good.

Therefore, by using the optical gain correction filter of this embodiment in the laser type bar code reader, the peripheral light intensity loss can be improved, increasing the reading performance, even in the configuration using the touch type scanner.

The above-mentioned optical gain correction filter will be explained in more detail.

Figure 5A:
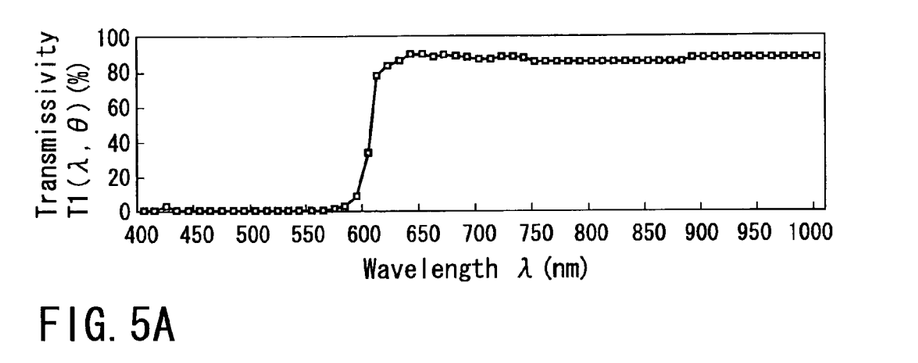
FIG. 5A is a graph showing the spectral transmissivity of a red resin of the optical gain correction filter according to the first embodiment.
Figure 5B:
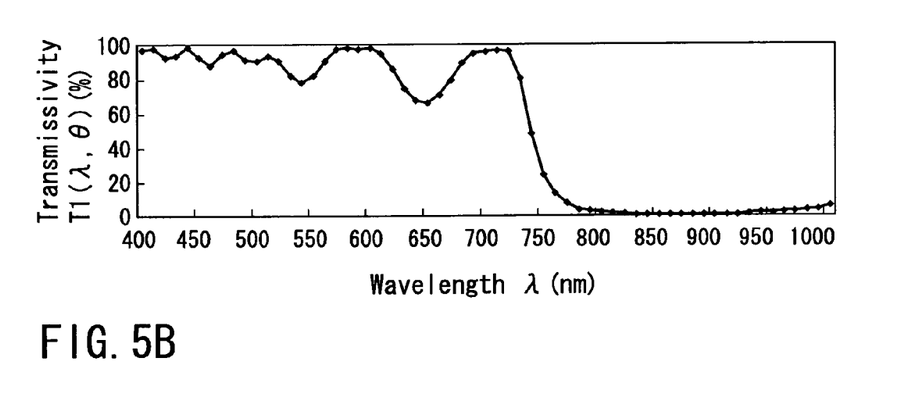
FIG. 5B is a graph showing the spectral transmissivity of a dielectric multilayer film evaporated on a white plate glass board in the optical gain correction filter according to the first embodiment.

FIG. 5A shows the spectral transmissivity in the red resin board 15. FIG. 5 shows the spectral transmissivity in the dielectric multilayer film 18 evaporated on the glass board 17.

Figure 6:
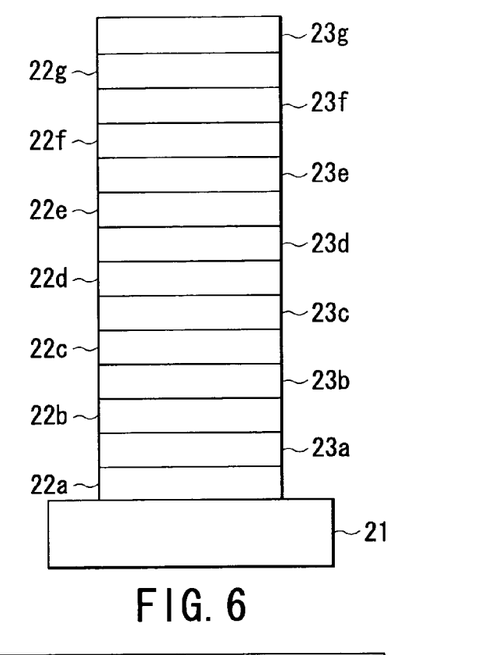
FIG. 6 is a view showing an example of the stacking structure of the dielectric multilayer film evaporated on the white plate glass board in the first embodiment.

The dielectric multilayer film 18 is a multilayer film formed by alternately stacking $SiO_2$ with the refractive index of 1.46 and $TiO_2$ with the refractive index of 2.3. FIG. 6 shows an example of the stacking structure of the dielectric multilayer film evaporated on a white plate glass board. The dielectric multilayer film comprises 14 layers, i.e., seven of $SiO_2$ and seven layers of $TiO_2$. The $SiO_2$ layers have an optical thickness of, for example, 73 to 232 nm each. The $TiO_2$ layers have an optical thickness of, for example, 208 to 233 nm each. Hence, as shown in FIG. 5B, the film has transmittivity of about 70% or less to the light applied from the light source and having wavelength $\lambda_0$ of about 650 nm; $\Delta\lambda_0$ is greater than 20 nm ($\Delta\lambda_0 > 20$ nm), where $\Delta\lambda_0 = \lambda_1 - \lambda_0$ and $\lambda_1 = 710$ nm; and the transmittivity changes by 30% or more in the wavelength region of $\lambda_0$(650 nm). That is, the transmittivity of the dielectric multilayer film increases as the wavelength $\lambda$ increases from $\lambda_0$ to $\lambda_1$.

Figure 7:
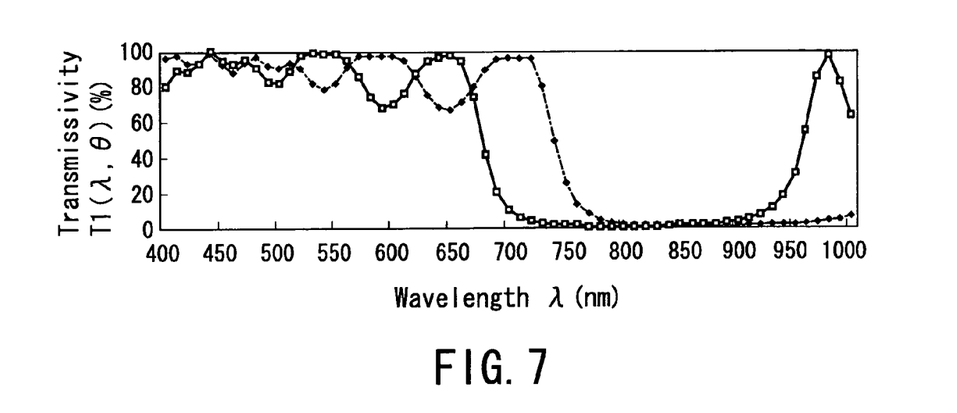
FIG. 7 is a graph showing the spectral transmissivity of the optical gain correction filter of the first embodiment, in the dielectric multilayer film.

FIG. 7 shows the spectral transmissivity of the optical gain correction filter, when the incident angle $\theta$ rises to the maximum $\theta\max=40°$.

Generally, when a multilayer film is formed by a dielectric such as $SiO_2$ and $TiO_2$, as the incident light angle $\theta$ increases, the optical path difference made between the intervals of the multilayer surfaces changes. Usually, as to two lights which interfere each other by reflecting on the adjacent surfaces of the dielectric multilayer film, the optical path difference made between these lights decreases as the incident angle increases.

Therefore, as the incident angle increases, the spectral characteristics shift, and as a result, the spectral transmissivity becomes to be as indicated by the solid line in FIG. 7, in this embodiment. Regarding light with the wavelength $\lambda_0=650$ nm, as the incident angle $\theta$ increases, the transmissivity T1 ($\lambda$, $\theta$) increases monotonously. FIG. 8 shows the change in the transmissivity T1 ($\lambda_0$, $\theta$) when the incident angle $\theta$ is increased against the light with the wavelength $\lambda_0=650$ nm. By sticking the glass board 17 evaporated with the above-mentioned dielectric multilayer film 18 to the above-mentioned red resin board 15, the optical gain correction filter having the spectral transmissivity shown in FIG. 9 can be formed.

Figure 9:
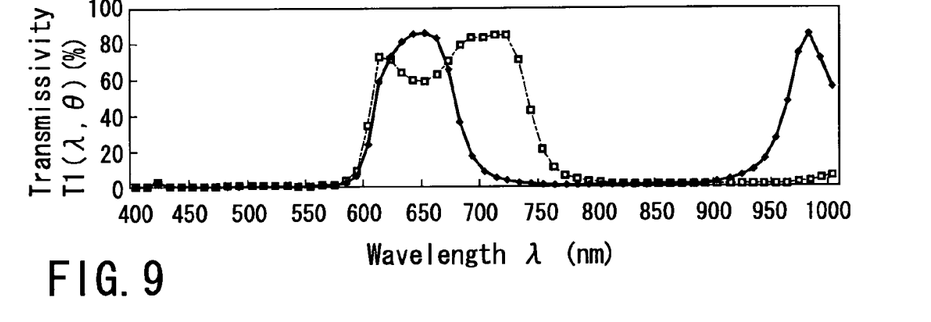
FIG. 9 is a graph showing the spectral transmissivity of the optical gain correction filter in the first embodiment, when the incident angle is changed.

In FIG. 9, the dotted line indicates the spectral transmissivity when the incident angle $\theta$ is 0°, and the solid line indicates the spectral transmissivity when the incident angle $\theta$ is 40°.

When constructing an optical apparatus by using the above-mentioned gain correction filter 12, design the maximum scanning angle of laser beam $\theta\max$ to about 40°, and adopt a semiconductor laser light source with a wavelength $\lambda_0=650$ nm as a light source. By arranging the optical gain correction filter 12 in front of the light receiving element 13, when the incident angle $\theta$ increases close to the maximum value $\theta\max$, the transmissivity T1 ($\lambda_0$, $\theta$) can be increased monotonously from 70% or lower up to about 90%.

Further, since the characteristics of the red resin board 15 are not changed even by changing the incident angle, the optical gain correction filter 12 provides good characteristics also as a band pass filter. Namely, it can preferably shut out light other than light having a wavelength to be taken in, as external light noise.

Therefore, by mounting the optical gain correction filter 12 of this embodiment in the optical apparatus of a bar code reader, a peripheral light intensity loss can be corrected, and unnecessary external light can be shut out, realizing a bar code reader with an excellent reading performance. Concretely, as shown in FIG. 4, a peripheral light intensity loss can be reduced by half in the range where an incident angle is about 25° maximum.

The bar code reader according to this embodiment can optimize adjustment of a threshold value in a binarization circuit, as described above, improving the reading performance. For example, when the contrast of a printed bar code is very low and difficult to be read by a conventional bar code reader because the influence of peripheral light intensity loss is serious, the bar code reader of this embodiment can read these bar codes. As for the bar code whose printing density is high and the signal amplitude is degraded, the influence of peripheral light intensity loss can be improved, and a bar code reader with good reading performance can be provided.

Further, a bar code reader with good reading performance can also be provided for a bar code which is wide and difficult to be read by a conventional bar code reader due to peripheral light intensity loss. Even in the reading conditions where the reading distance is largely changed and the signal amplitude is degraded by defocusing, it is possible, by mounting a semiconductor laser light source, to provide a general purpose bar code reader having the features of both laser type and touch type, which is unaffected by light intensity, and maintains excellent performance over all reading areas, the feature of the laser type, and can also be used as a touch type bar code reader.

Having this versatility, one type of bar code reader designed for reading a bar code from a distance can be used as a touch type reader for reading a bar code set close, and the problem of financial loss generated upon changing the system can be reduced.

In this embodiment, the optical gain correction filter is formed by bonding a red resin and a short-wavelength transmission filter, but is not possible restricted to this configuration. For example, it is to evaporate a short-wavelength transmission filter, having a similar transmissivity, on a red glass board. This provides an equivalent function and effect with one component, and reduces the product size. It is also possible to form an equivalent dielectric multilayer film by evaporating on the surface of a white plate glass, and to form by evaporation a long-wavelength transmission filter having a characteristic equivalent to the red resin plate on the rear side. In this case, a red resin board is not used, and the cost is reduced.

Next, a second embodiment will be explained.

Figure 10:
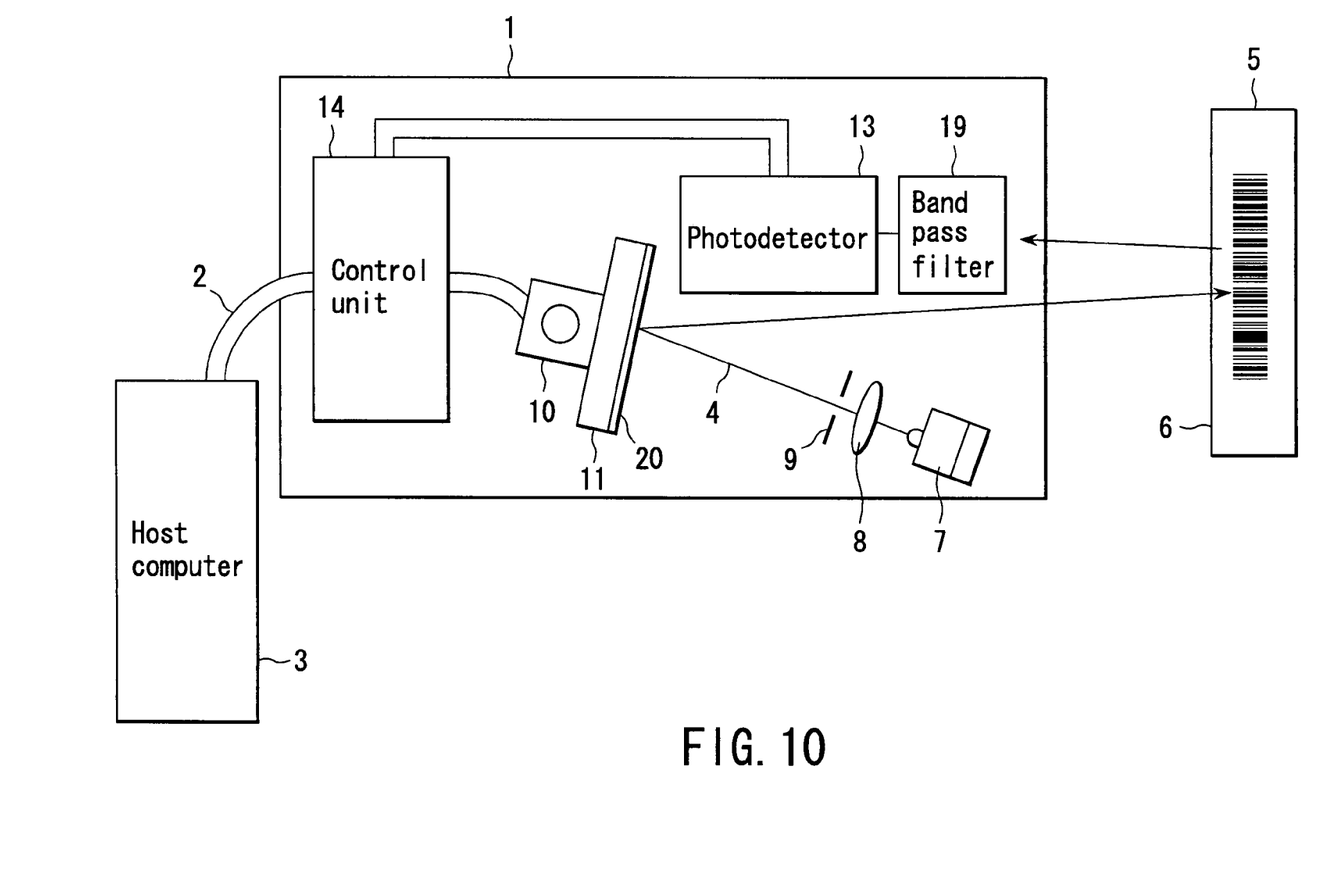
FIG. 10 is a diagram showing an example of a conceptual configuration of an optical apparatus having an optical gain correction filter according to a second embodiment, applied to a bar code reader.

FIG. 10 shows an example of a configuration of an optical apparatus having an optical gain correction filter according to a second embodiment, applied to a bar code reader.

An optical apparatus 1 is provided with a band pass filter 19 and an optical gain correction filter (an optical mirror) 20. The other components are the same as those in the first embodiment shown in FIG. 1, and the detail explanation will be omitted.

In the above-mentioned first embodiment, the optical gain correction filter 12 is provided in front of the photodetector 13. But, in the second embodiment, an optical gain correction filter 20 is provided on the reflection surface of a reflector mirror 11 that is turned by electromagnetic fluctuation. The reflected light from the bar code 6 is received by the photodetector 13 through the band pass filter 19. The band pass filter 19 shuts off the other light except that having the emitted wavelength, as external light noise.

The optical gain correction filter 20 is formed to be a multilayer film structure formed by stacking a plurality of thin films with different refractive indices on the reflection surface (board) of the reflector mirror 11, and the thickness of each thin film is set to increase the reflectivity R1 ($\lambda_0$, $\theta$) when the incident angle $\theta$ increases close to the predetermined maximum incident angle $\theta\max$ with respect to the incident light with the wavelength $\lambda_0$, assuming that the reflectivity is R1 ($\lambda_0$, $\theta$) ($0 \leq$ R1 ($\lambda$, $\theta$) $\leq 1$) when the light with the wavelength $\lambda$ enters at the incident angle $\theta$.

By arranging this optical gain correction filter 20 on the optical path of a laser beam in the direction where the reflectivity R1 ($\lambda$, $\theta$) increases as the laser scanning angle increases, the function of correcting the above-mentioned peripheral light intensity loss can be realized.

Therefore, even if a touch type bar code reader is formed by adopting the semiconductor laser light source 7, the peripheral light intensity loss can be corrected and signal obtained from the photodetector 13 can be stabilized.

According to this embodiment, by arranging the optical gain correction filter 20 not in front of the photodetector 13, but on the optical path between the semiconductor laser light source 7 and photodetector 13, an equivalent effect can be obtained. However, if an external light comes in before the light passing through the optical gain correction filter 20 reaches the photodetector 13, it is necessary to provide the band pass filter 19 in front of the photodetector 13.

The dielectric multilayer film in the first embodiment is $SiO_2$ or $TiO_2$, but is not restricted to these materials. So-called high refractive index materials, for example, $CeO_2$, $ZrO_2$, $Ta_2O_5$, ZnS can be used instead of $TiO_2$. So-called low refractive index materials, for example, $MgF_2$ can be used instead of $SiO_2$. It is also possible to use intermediate refractive index materials such as $Al_2O_3$ and SiO. It is also possible to optimize the refractive index by using a material which includes at least one of the above materials.

Further, the stacking structure in the first embodiment is shown in FIG. 6, but the structure is not restricted to this structure. Namely, when the number of layers is decreased, the production cost can be reduced, but the spectral transmissivity degrades. Contrarily, when the number of layers is increased, the spectral transmissivity can be optimized, but the production cost rises. Therefore, the number of layers is desirably 5–45 layers. With this number of layers, it is possible to provide an optical gain correction filter with satisfactory optical characteristics at a low production cost.

Further, in the second embodiment, if the number of layers is set to a range of 2–10 layers, it is possible to provide an optical gain correction filter with satisfactory optical characteristics at a low production cost. As to the thickness of each layer, if the thickness is lower than 3 nm, management of production becomes difficult. If the thickness exceeds 350 nm, a problem arises in the material stability. Therefore, the layer thickness is desirable over 3 nm and below 350 nm in optical thickness.

According to this embodiment, it is possible to provide a general purpose bar code reader which has the features of both popular laser type and line sensor type.

A bar code that can be used in the above-mentioned embodiments includes JAN, Code 39, ITF (Interleaved 2 of 5), Codabar, Code 128, UCC/EAN 128, Bookland EAN, MSI Plessey, Code 93, Reduced Space Symbology, etc. Bar codes, formed by combination of line, dot and segment, or codes for the purpose of reading symbols, engraved bumps and dips, and other special patterns, are also permitted. Examples of reading a bar code have been explained, but the embodiments are not restricted to these examples. Namely, it is also possible to mount the optical gain correction filter of this embodiment in an ordinary optical apparatus, in which a peripheral light intensity loss occurs, and use it for the purpose of improving a peripheral light intensity loss for light with a specific wavelength.

As explained above in detail, according to the present invention, it is possible to provide a general purpose optical gain correction filter, which can correct a peripheral light intensity loss when mounting a touch type bar code reader using a semiconductor laser light source, providing a stabilized and improved performance of reading high-density, low-contrast and wide bar codes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical gain correction filter comprising:
   a multilayer film structure formed by stacking a plurality of thin films with different refractive indices on a light transmitting board,
   wherein when light with a wavelength $\lambda$ enters at an incident angle $\theta$, a transmissivity is assumed to be T1 $(\lambda, \theta)$ $(0 \leq T1(\lambda, \theta) \leq 1)$, and a thickness of each thin film is set to increase the transmissivity T1 $(\lambda_0, \theta)$ when the incident angle $\theta$ increases close to a predetermined maximum incident angle $\theta$max with respect to the incident light with a wavelength $\lambda_0$ entering the multilayer film structure.

2. The optical gain correction filter according to claim 1, wherein the plurality of thin films comprise alternately stacked $SiO_2$ films with a refractive index of 1.46 and $TiO_2$ films with a refractive index of 2.3.

3. The optical gain correction filter according to claim 2, wherein the transmissivity is not more than 70% so that the wavelength $\lambda_0$ of the incident light coincides with a position of a ripple of a band pass filter.

4. The optical gain correction filter according to claim 1, wherein the thin films comprise alternately stacked (a) films made from one of $SiO_2$, $MgF_2$, $Al_2O_3$ and SiO and (b) films made from one of $TiO_2$, $CeO_2$, $ZrO_2$, $Ta_2O_5$ and ZnS.

5. An optical gain correction filter comprising:
   a multilayer film structure formed by stacking a plurality of thin films with different refractive indices on a light transmitting board, wherein
   when light with a wavelength $\lambda$ enters at an incident angle $\theta$ a transmissivity is assumed to be T1 $(\lambda, \theta)$ $(0 \leq T1(\lambda, \theta) \leq 1)$, and a thickness of each thin film is set to increase the transmissivity T1 $(\lambda, \theta_0)$ when the wavelength $\lambda$ increases close to a predetermined maximum wavelength $\lambda$max with respect to the incident light entering the multilayer structure at an incident angle of $\theta_0$.

6. The optical gain correction filter according to claim 5, wherein the plurality of thin films comprise alternately stacked $SiO_2$ films with a refractive index of 1.46 and $TiO_2$ films with a refractive index of 2.3.

7. The optical gain correction filter according to claim 6, wherein the transmissivity is not more than 70% so that the wavelength $\lambda_0$ of the incident light coincides with a position of a ripple of a band pass filter.

8. The optical gain correction filter according to claim 5, wherein the thin films comprise alternately stacked (a) films made from one of $SiO_2$, $MgF_2$, $Al_2O_3$ and SiO and (b) films made from one of $TiO_2$, $CeO_2$, $ZrO_2$, $Ta_2O_5$ and ZnS.

9. An optical gain correction filter comprising:
   a multilayer film structure formed by stacking a plurality of thin films with different refractive indices on a light reflecting board,
   wherein when light with a wavelength $\lambda$ enters at an incident angle $\theta$, a reflectivity is assumed to be R1 $(\lambda, \theta)$ $(0 \leq R1(\lambda, \theta) \leq 1)$, and a thickness of each thin film is set to increase the reflectivity R1 $(\lambda_0, \theta)$ when the incident angle $\theta$ increases close to a predetermined maximum incident angle θmax with respect to the incident light with a wavelength $\lambda_0$ entering the multilayer film structure.

10. The optical gain correction filter according to claim 9, wherein the plurality of thin films comprise alternately stacked $SiO_2$ films with a refractive index of 1.46 and $TiO_2$ films with a refractive index of 2.3.

11. The optical gain correction filter according to claim 10, wherein the reflectivity is not more than 70% so that the wavelength $\lambda_0$ of the incident light coincides with a position of a ripple of a band pass filter.

12. The optical gain correction filter according to claim 9, wherein the thin films comprise alternately stacked (a) films made from one of $SiO_2$, $MgF_2$, $Al_2O_3$ and SiO and (b) films made from one of $TiO_2$, $CeO_2$, $ZrO_2$, $Ta_2O_5$ and ZnS.

13. An optical gain correction filter comprising:
a multilayer film structure formed by stacking a plurality of thin films with different refractive indices on a light reflecting board,
wherein when light with a wavelength λ enters at an incident angle θ, a reflectivity is assumed to be R1 (λ, θ) (0≦R1 (λ, θ)≦1), and a thickness of each thin film is set to increase the reflectivity R1 (λ, $\theta_0$) when the wavelength λ increases close to a predetermined maximum wavelength λmax with respect to the incident light entering the multilayer structure at an incident angle of $\theta_0$.

14. The optical gain correction filter according to claim 13, wherein the plurality of thin films comprise alternately stacked $SiO_2$ films with a refractive index of 1.46 and $TiO_2$ films with a refractive index of 2.3.

15. The optical gain correction filter according to claim 14, wherein the reflectivity is not more than 70% so that the wavelength $\lambda_0$ of the incident light coincides with a position of a ripple of a band pass filter.

16. The optical gain correction filter according to claim 14, wherein the thin films comprise alternately stacked (a) films made from one of $SiO_2$, $MgF_2$, $Al_2O_3$ and SiO and (b) films made from one of $TiO_2$, $CeO_2$, $ZrO_2$, $Ta_2O_5$ and ZnS.

17. An optical apparatus comprising:
a semiconductor laser light source which emits a laser beam having a wavelength of $\lambda_0$;
a scanning section for scanning the laser beam radiated from the semiconductor laser light source;
a photodetector for receiving scattered light from the scanned laser beam; and
an optical gain correction filter, which is arranged on an optical path from the semiconductor laser light source to the photodetector, and which comprises a multilayer film structure formed by stacking a plurality of thin films with different refractive indices on a light transmitting board;
wherein when light with a wavelength λ enters at an incident angle θ, a transmissivity is assumed to be T1 (λ, θ) (0≦T1 (λ, θ)≦1), and a thickness of said each thin film is set to increase the transmissivity T1 ($\lambda_0$, θ) when the incident angle θ increases close to a predetermined maximum incident angle θmax with respect to the incident light with a wavelength $\lambda_0$ entering the multilayer film structure; and
wherein the optical gain correction filter is arranged to increase the transmissivity T1 (λ, θ) as an incident angle of the scattered light increases.

18. The optical apparatus according to claim 17, wherein the optical gain correction filter is provided one of: on a reflection surface of the scanning section, and in front of the photodetector.

19. An optical apparatus comprising:
a semiconductor laser light source which emits a laser beam having a wavelength of $\lambda_0$;
a scanning section for scanning the laser beam radiated from the semiconductor laser light source;
a photodetector for receiving scattered light from the scanned laser beam; and
an optical gain correction filter, which is arranged on an optical path from the semiconductor laser light source to the photodetector, and which comprises a multilayer film structure formed by stacking a plurality of thin films with different refractive indices on a light reflecting board;
wherein when light with a wavelength λ enters at an incident angle θ a transmissivity is assumed to be T1 (λ, θ) (0≦T1 (λ, θ)≦1), and a thickness of said each thin film is set to increase the transmissivity T1 (λ, $\theta_0$) when the wavelength λ increases close to a predetermined maximum wavelength λmax with respect to the incident light entering the multilayer structure at an incident angle of $\lambda_0$; and
wherein the optical gain correction filter is arranged to increase the transmissivity T1 (λ, θ) as an incident angle of the scattered light increases.

20. The optical apparatus according to claim 19, wherein the optical gain correction filter is provided one of: on a reflection surface of the scanning section, and in front of the photodetector.

21. An optical apparatus comprising:
a semiconductor laser light source which emits a laser beam having a wavelength of $\lambda_0$;
a scanning section for scanning the laser beam radiated from the semiconductor laser light source;
a photodetector for receiving scattered light from the scanned laser beam; and
an optical gain correction filter, which is arranged on an optical path from the semiconductor laser light source to the photodetector, and which comprises a multilayer film structure formed by stacking a plurality of thin films with different refractive indices on a light reflecting board;
wherein when light with a wavelength λ enters at an incident angle θ, a reflectivity is assumed to be R1 (λ, θ) (0≦R1 (λ, θ)≦1), and a thickness of said each thin film is set to increase the reflectivity R1 ($\lambda_0$, θ) when the incident angle θ increases close to a predetermined maximum incident angle θmax with respect to the incident light with a wavelength $\lambda_0$ entering the multilayer film structure; and
wherein the optical gain correction filter is arranged to increase the reflectivity R1 (λ, θ) as an incident angle of the scattered light increases.

22. The optical apparatus according to claim 21, wherein the optical gain correction filter is provided one of: on a reflection surface of the scanning section, and in front of the photodetector.

23. An optical apparatus comprising:
a semiconductor laser light source which emits a laser beam having a wavelength of $\lambda_0$;

a scanning section for scanning the laser beam radiated from the semiconductor laser light source;

a photodetector for receiving scattered light from the scanned laser beam; and an optical gain correction filter, which is arranged on an optical path from the semiconductor laser light source to the photodetector, and which comprises a multilayer film structure formed by stacking a plurality of thin films with different refractive indices on a light reflecting board;

wherein when light with a wavelength $\lambda$ enters at an incident angle $\theta$, a reflectivity is assumed to be R1 ($\lambda$, $\theta$) ($0 \leq$ R1 ($\lambda$, $\theta$) $\leq 1$), and a thickness of said each thin film is set to increase the reflectivity R1 ($\lambda$, $\theta_0$) when the wavelength $\lambda$ increases close to a predetermined maximum wavelength $\lambda$max with respect to the incident light entering the multilayer structure at an incident angle of $\theta_0$; and wherein the optical gain correction filter is arranged to increase the reflectivity R1 ($\lambda$, $\theta$) as an incident angle of the scattered light increases.

24. The optical apparatus according to claim 23, wherein the optical gain correction filter is provided one of: on a reflection surface of the scanning section, and in front of the photodetector.

* * * * *